United States Patent [19]
Lee

[11] Patent Number: 5,337,875
[45] Date of Patent: Aug. 16, 1994

[54] ROLLER TYPE MATERIAL RACK

[76] Inventor: Adolfo Lee, No. 1, Lane 96, Pin-Der Rd., Pei Tun Area, Taichung, Taiwan

[21] Appl. No.: 44,471

[22] Filed: Apr. 9, 1993

[51] Int. Cl.5 .............................................. B65G 13/00
[52] U.S. Cl. ................................ 193/35 R; 193/35 C; 269/289 MR
[58] Field of Search .......................... 193/35 R, 35 C; 198/826; 269/289 MR, 902

[56] References Cited

U.S. PATENT DOCUMENTS

| | | | |
|---|---|---|---|
| 977,987 | 12/1910 | Willson | 198/826 |
| 2,405,810 | 8/1946 | Berg et al. | 193/35 R |
| 2,740,513 | 4/1956 | Sullivan | 193/35 R |
| 3,225,945 | 12/1965 | Yoder | 193/35 R |
| 3,917,087 | 11/1975 | Godbersen | 193/35 C |
| 4,114,749 | 9/1978 | Carroll et al. | 193/35 C |
| 4,781,515 | 11/1988 | Johnson | 193/35 C |

*Primary Examiner*—Joseph E. Valenza
*Attorney, Agent, or Firm*—Browdy and Neimark

[57] ABSTRACT

A roller type material rack comprises a base frame, two receiving mounts, and two rollers. The rollers are pivoted respectively to the receiving mounts for holding the material. The receiving mounts are pivoted symmetrically to the base frame such that the receiving mounts can be located at a predetermined position. The receiving mounts can be therefore adjusted to hold the materials having various shapes and sizes.

5 Claims, 3 Drawing Sheets

ROLLER TYPE MATERIAL RACK

FIELD OF THE INVENTION

The present invention relates to a material rack of a process machinery, and more particularly to a roller type rack for holding materials of various shapes and sizes.

BACKGROUND OF THE INVENTION

There are two kinds of the prior art roller type material racks. The first kind comprises a roller pivoted horizontally to a fastening mount for holding a square material or a platelike material. The second kind comprises two rollers which are fastened in a V-shaped manner for holding a round material having certain outer diameters. It is a well-known fact that process materials have different shapes and sizes. The materials having a sector cross section or a triangular cross section can not be held on the prior art roller type racks described above. In addition, the round materials have different outer diameters. As a result, the V-shaped roller type racks having different open angles must be used to hold various round materials. It is often inconvenient for an operator to change the racks to suit the shapes and the sizes of the materials to be processed.

SUMMARY OF THE INVENTION

It is therefore the primary objective of the present invention to provide a roller type rack for holding materials having different shapes and sizes.

It is another objective of the present invention to provide a roller type material rack capable of conveying materials in a predetermined direction.

The foregoing objectives of the present invention are attained by a roller type material rack, which comprises a base frame, two receiving mounts fastened symmetrically on the base frame, and two rollers pivoted respectively to the receiving mounts. The roller type material rack is characterized in that the receiving mounts are mounted on the base frame in such a manner that each of the two receiving mounts can rotate to a predetermined angle at which it is then located.

When each of the two receiving mounts is caused to turn to be in a horizontal position at which it is then located, the roller type rack can be used to hold a square material or a platelike material. When the receiving mounts rotate oppositely and upwards for a predetermined angle at which they are located, the roller type rack can be used to hold round materials having different outer diameters or materials having a triangular cross section, depending on the size of the angle formed by the two receiving mounts. In addition, one receiving mount can be kept at a horizontal position while another receiving mount can be caused to rotate upwards for a predetermined angle at which it is located. As a result, one side of the material can be placed against the roller whose receiving mount rotates upwards, so as to convey the material in a predetermined direction.

Each receiving mount of the roller type material rack of the present invention is provided with two semicircular lugs parallel to each other. Each of the lugs is pivoted to the base frame and provided along the edge thereof with a plurality of notches. Each of the notches is corresponding to a predetermined angle. The base frame is provided with a locating pin, which can be located at an upper position and then moved away from the upper position. When the locating pin is located at the upper position, the locating pin can be retained in a slot at the same position as the two parallel lugs, so as to cause the receiving mount to be located on an angle corresponding to the slot. When the locating pin is caused to move away from the upper position, each of the receiving mounts begins to rotate in a direction opposite to the base frame. A preferred embodiment of the present invention is provided with an elastic member disposed between the locating pin and the base frame for keeping the locating pin at the upper position in the absence of an external force.

DETAILED DESCRIPTION OF THE PREFERRED EMBODIMENT

Figure 1:
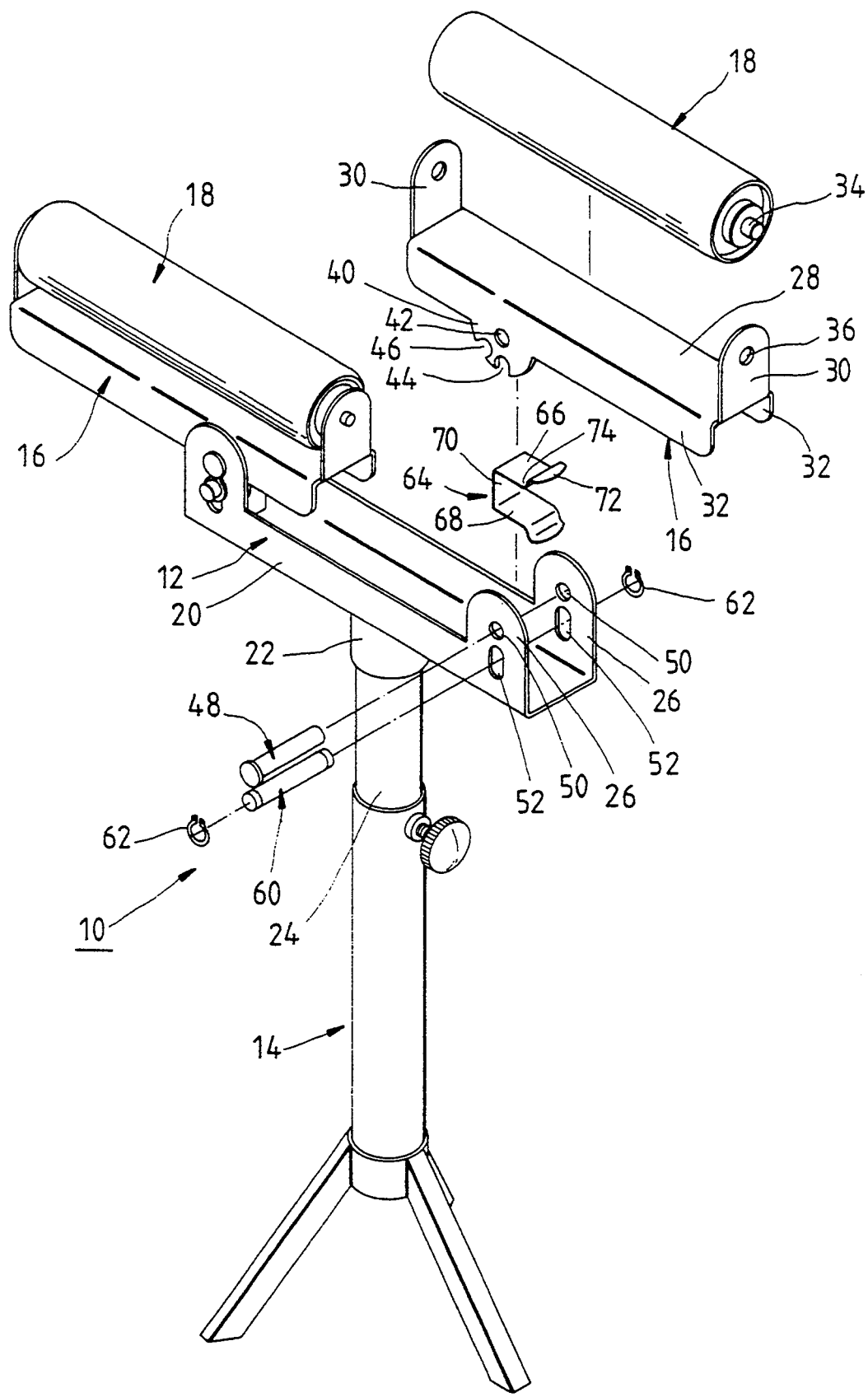
FIG. 1 shows a partial exploded view of the present invention.
Figure 2:
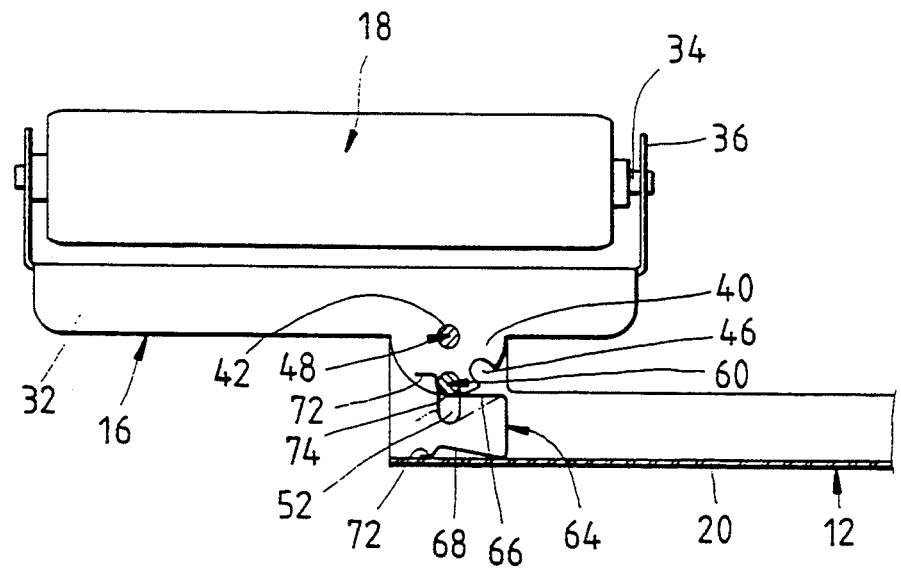
FIG. 2 is a sectional view of a portion taken along the line 2—2 as shown in FIG. 1, with the receiving mount being located at a horizontal position.
Figure 3:
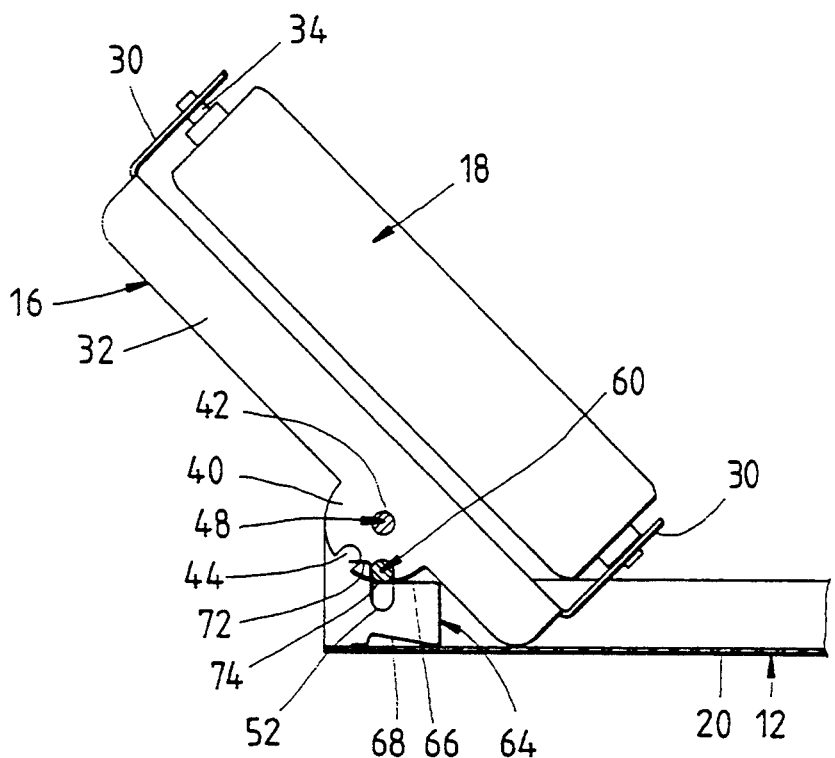
FIG. 3 is a sectional view of a portion taken along the line 2—2 as shown in FIG. 1, with the receiving mount being located at a 45-degree position.

Referring to FIGS. 1-3, a roller type material rack 10 of the present invention is shown to comprise a base frame 12, a leg 14 fastened to the underside of the base frame 12, two receiving mounts 16 pivoted symmetrically and respectively to the base frame 12, and two rollers 18 pivoted respectively to the receiving mounts 16.

The base frame 12 has a frame body 20 which is U-shaped in its cross section, a sleeve 22 extending downwards from the center of the underside of the frame body 20 so as to fit over the upper end of a middle post 24 of the leg 14, and two pairs of locating lugs 26 located respectively at the opposite ends of the short axis of the frame body 20 in such a manner that they are parallel to each other. Each receiving mount 16 has a rectangular plate 28, two holding pieces 30 extending upwards and respectively from the opposite ends of the longitudinal axis of the rectangular plate 28, and two wings 32 extending downwards and respectively from the opposite ends of the short axis of the rectangular plate 28. Each of the two rollers 18 is pivoted to the pivoting holes 36 of the holding piece 30 by means of a shaft 34.

The roller type material rack 10 of the present invention is characterized in that each of the two parallel wings 32 of the receiving mount 16 is provided with a semicircular lug 40 located at a position about one third of the length of the wing 32. In other words, there are two semicircular lugs 40 which extend downwards and which are located symmetrically. Each lug 40 is provided in the edge thereof with a first notch 44 right under the center 42 of the circle, and with a second notch 46 spaced at an interval of 45 degrees from the first notch 44. In combination, each of the semicircular lugs 40 is located in the inner side of the two parallel locating lugs 26 of the base frame 12. The receiving mount 16 is pivoted to the base frame 12 by means of a locating pin 48 passing through the center 42 of the semicircular lug 40 and the pivoting hole 50 of the locating lug 26. Each lug 26 is provided under the pivoting hole 50 with a strip hole 52. A locating pin 60 is put through the strip holes 52 of the two parallel locating lugs 26. The locating pin 60 is fastened respectively at both ends thereof with a C-shaped retaining ring 62 so as to allow the locating pin 60 to move up and down in the strip hole 52. In combination, an elastic member 64 is disposed between the locating pin 60 and the inner side of the bottom board of the frame body 20 of the base frame 12. The elastic member 64 has an upper arm 66, a lower arm 68, and a rectangular portion 70 bridging the upper arm 66 and the lower arm 68. The upper and the lower arms 66 and 68 are provided respectively with an upper folded portion 72 having a recess 74. When the elastic member 64 is located, the locating pin 60 is received in the recess 74 of the upper arm 66 while the lower arm 68 urges the bottom of the frame body 20. As a result, the locating pin 60 is caused by the tension of the elastic member 64 to press against the upper edge of the strip hole 52. In other words, the locating pin 60 can be easily caused to move away from the upper position by pulling both ends of the locating pin 60 downwards. When the locating pin 60 is at the upper position, it is near each of the semicircular lugs 40. When each lug 40 is so rotated that the first notch 44 or the second notch 46 is located over the locating pin 60, which is forced by the elastic member 64 to enter the first notch 44 or the second notch 46. As a result, the receiving mount 16 is located on the angle corresponding to the notch, as shown in FIGS. 2 and 3.

Figure 4:
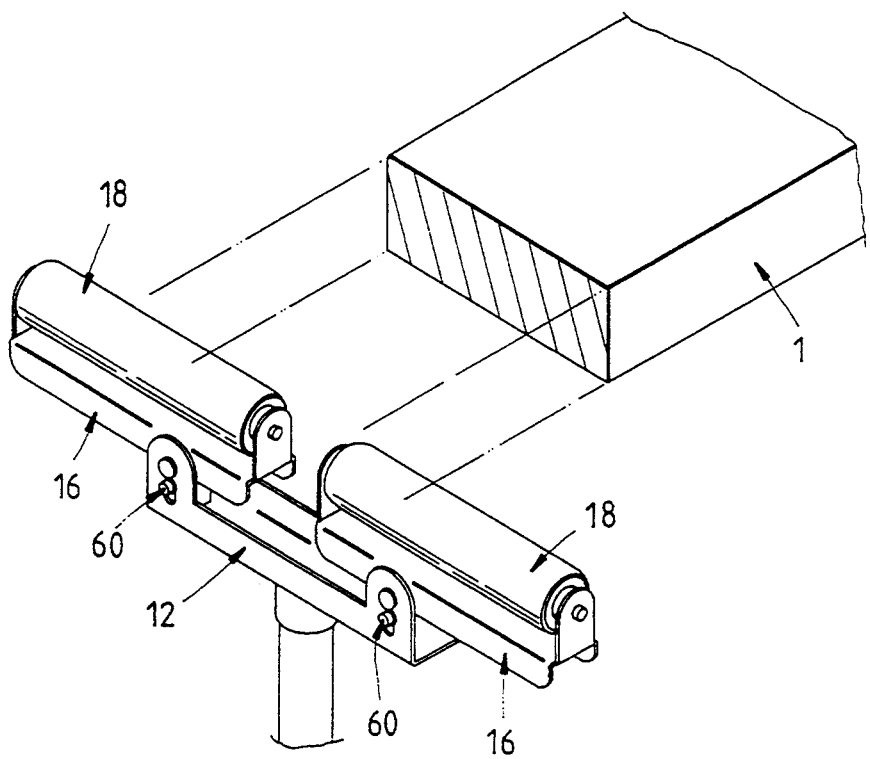
FIG. 4 shows a perspective schematic view of the present invention holding thereon a material having a square shape.
Figure 6:
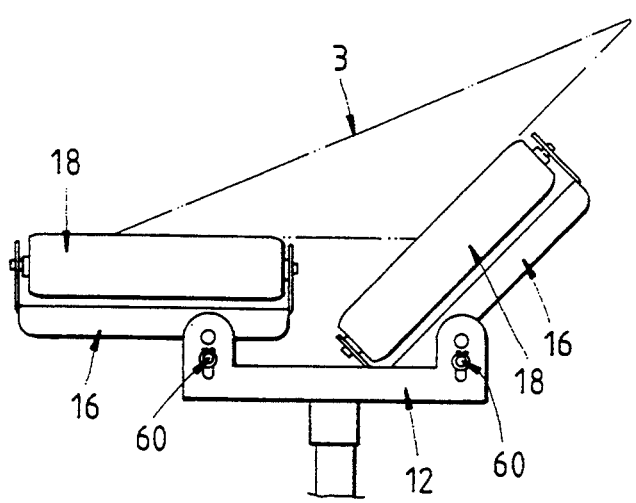
FIG. 6 shows a perspective schematic view of the present invention holding thereon a material having a triangular shape.
Figure 5:
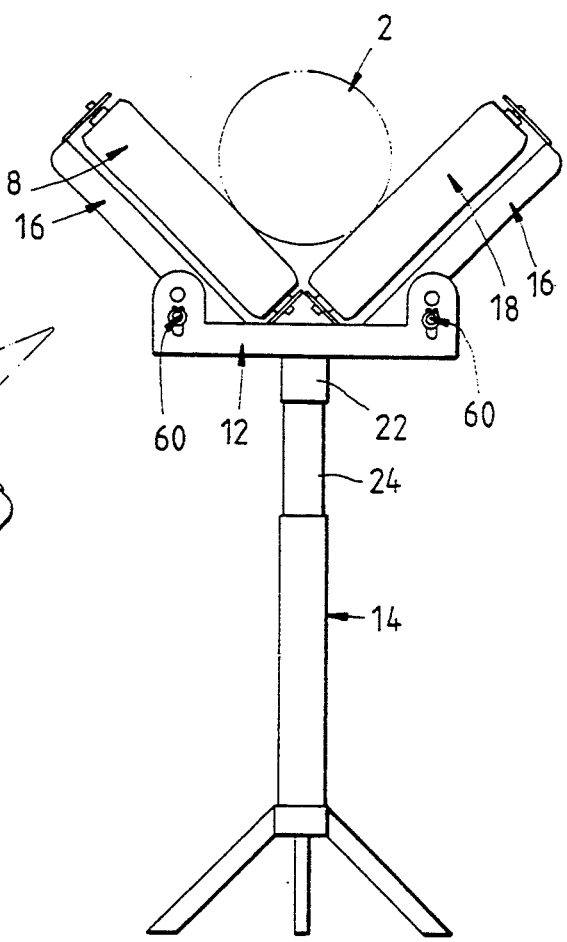
FIG. 5 shows a perspective schematic view of the present invention holding thereon a material having a round shape.

As shown in FIGS. 4–6, the roller type material rack 10 of the present invention is used to hold a rectangular material 1. As shown in FIG. 4, the locating pin 60 is inserted into the first notch 44 over the circle center 42 of the semicircular lug 40. The receiving mount 16 is horizontally located to hold the rectangular material 1. When a round material 2 is intended to be carried, the locating pin 60 is inserted into the second notch 46 of the semicircular lug 40 so that the receiving mount 16 of V-shaped construction is available for holding the round material 2, as shown in FIG. 5. If a material 3 having a triangular shape with an inner angle of 135 degrees is to be carried by the rack 10 of the present invention, one locating pin 60 is inserted into the first notch 44 while another locating pin 60 is inserted into the second notch 46. As a result, one receiving mount 16 of the rack 10 is horizontally located while another receiving mount 16 is located at a 45-degree position, as shown in FIG. 6. The receiving mounts 16 can be positioned independently. Therefore, when only one receiving mount 16 of the roller 18 is used to hold the material, another receiving mount 16 can be folded upwards to press against the material which is intended to be conveyed in a predetermined direction.

What is claimed is:

1. A roller type material rack comprising a base frame, two receiving mounts fastened respectively and symmetrically to said base frame, and two rollers pivoted respectively to said receiving mounts; wherein said receiving mounts are fastened to said base frame such that said receiving mounts can be turned for a predetermined angle and then located at said angle.

wherein said base frame has a frame body having a U shape in cross section and having a locating lug located at each of both ends of the longitudinal axis of said frame body; wherein said receiving mounts have a rectangular plate, two holding pieces extending vertically and respectively from both ends of the longitudinal axis of said rectangular plate, and two wings extending vertically and respectively from both ends of the short axis of said rectangular plate in a direction opposite to said holding pieces, with each of said wings having a semicircular lug provided with a plurality of notches corresponding to a plurality of angles, said semicircular lug being pivoted to said locating lug of each of said receiving mounts; and wherein said base frame further comprises a locating pin fastened to said locating lug such that said locating pin can be located at an upper position and that said locating pin can be moved away from said upper position, with said locating pin being inserted into one of said notches at such time when said locating pin is located at said upper position.

2. The roller type material rack according to claim 1 wherein said semicircular lug is located in an inner side of said locating lug and is fastened to said locating lug by means of a fastening pin.

3. The roller type material rack according to claim 2 wherein said locating lug is provided with a strip hole under an axis of said fastening pin, with said locating pin passing through said strip hole; wherein said rack further comprises an elastic member located between a bottom of said frame body of said base frame and said locating pin such that said elastic member is capable of urging said locating pin to move against the top edge of said strip hole.

4. The roller type material rack according to claim 3 wherein said elastic member has an upper arm supporting said locating pin and a lower arm urging said frame body of Said base frame.

5. The roller type material rack according to claim 4 wherein said upper arm of said elastic member is provided with a recess to receive therein said locating pin.

* * * * *